April 24, 1951     A. M. YOUNG     2,550,513
SIDE-BY-SIDE COFFEE MAKER
Filed Dec. 24, 1948
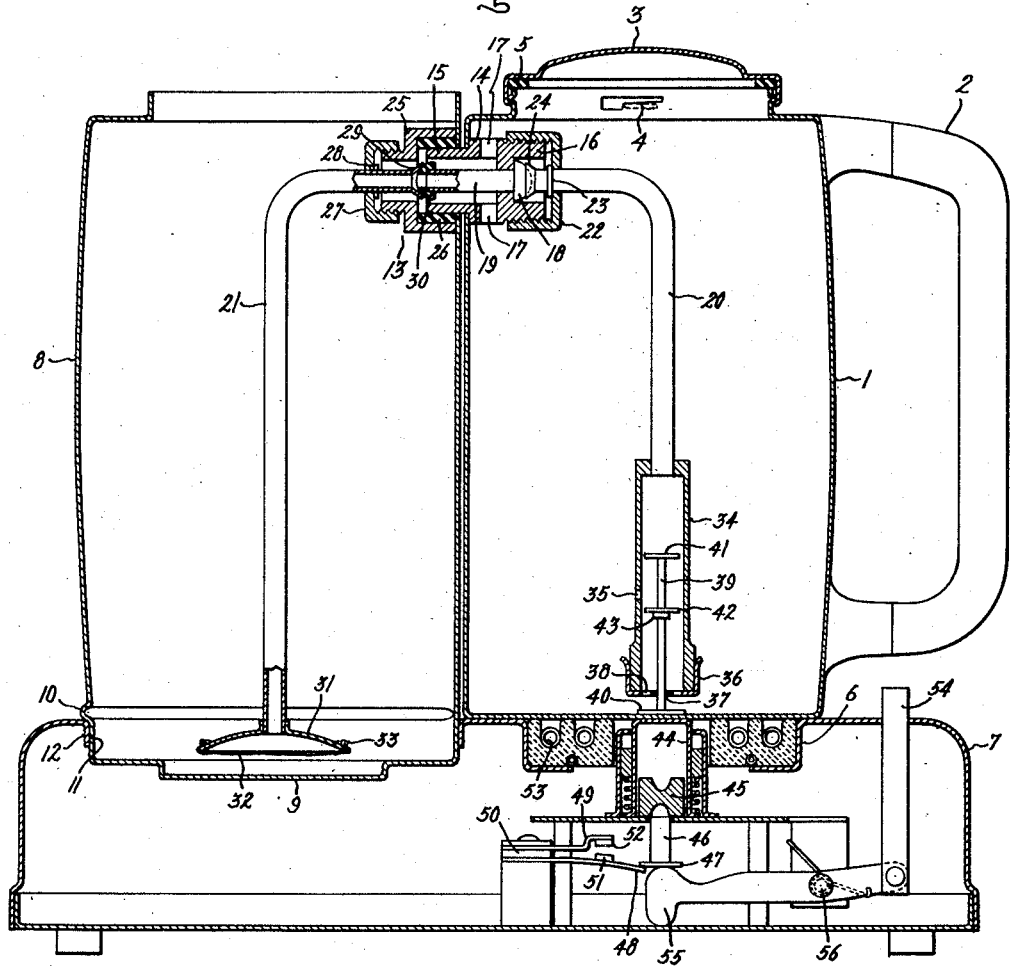
Inventor:
Allan M. Young,
by Sheridan W. Riggs
His Attorney.

Patented Apr. 24, 1951

2,550,513

UNITED STATES PATENT OFFICE 2,550,513

SIDE-BY-SIDE COFFEE MAKER

Allan M. Young, Meriden, Conn., assignor to General Electric Company, a corporation of New York Application December 24, 1948, Serial No. 67,136

5 Claims. (Cl. 99—292)

My invention relates to coffee makers and more particularly to a "side-by-side" vacuum type coffee maker wherein a water heating receptacle is placed alongside a cooperating coffee brewing receptacle.

It is an object of my invention to provide a coffee maker of the above type in which the coffee making process is completely automatic.

Another object is to provide a side-by-side coffee maker which can be used in combination with an electric stove or heater such as described and claimed in U. S. Patent 2,287,583 issued to Walter R. Weeks, June 23, 1942, and in U. S. Patent 2,445,591 granted to E. C. Sullivan, July 20, 1948.

Another object is to provide an easily separable fluid-tight connection between the receptacles of the above type coffee maker.

A further object is to provide, in a side by side coffee maker, a pouring spout for a heating receptacle which also functions as a connecting member to an adjacent coffee brewing receptacle.

One embodiment of my invention, in fulfillment of the foregoing objects, comprises a fluid-tight water heating receptacle removably positioned beside a coffee brewing receptacle and having a pouring spout arranged to be inserted within a correspondingly aligned sealing member which is secured to the brewing receptacle. The sealing member makes a fluid-tight connection to a tubular liquid transferring member extending from the heating receptacle through the spout and sealing member to the brewing receptacle. This liquid transferring member is connected within the spout in a manner constructed to be easily detachable so that the heating receptacle may be easily separated from the brewing receptacle upon completion of the coffee making process.

An armature and a mechanism for elevating this armature responsive to an amount of vapor and water pressure generated within the heating receptacle are supported within the heating receptacle by the liquid transferring member. The armature magnetically cooperates with a reciprocable member within an associated heater to automatically reduce the heat applied to the heating receptacle during the coffee making process.

The novel features which I believe to be characteristic of my invention are set forth with particularity in the appended claims. My invention itself, however, together with further objects and advantages may best be understood by reference to the following description taken in connection with the accompanying drawing in which Fig. 1 is a vertical sectional view of one embodiment of my invention, and Fig. 2 is a vertical view partly in section of the pouring spout shown in Fig. 1.

Referring to the drawing, I have shown my invention in one form as comprising a water heating vessel or receptacle 1 having a handle 2 and a cover 3 sealable to receptacle 1 by virtue of a plurality of bayonet clamps 4 and a sealing gasket 5. Receptacle 1 is removably positioned on a stove or heater 6 which is enclosed within a base 7 and preferably is of the type described and claimed in the above-mentioned patents.

A coffee brewing vessel or receptacle 8 open at the top and having a cylindrical recessed portion 9 in the bottom thereof is removably positioned beside the heating receptacle 1 on base 7.

In order to position securely the brewing receptacle 8, despite the uneven configuration of its bottom surface, I provide an annular flange or lip 10 formed in the vertical wall of receptacle 8 and spaced a short distance from the bottom thereof. When receptacle 8 is inserted within an aperture 11 formed in base 7, this flange 10 rests on the rim 12 of aperture 11 and functions to support receptacle 8 thereon. The base 7, the configuration of the bottom of receptacle 8, and the manner of supporting receptacle 8 on base 7 are described and claimed in my co-pending United States application Serial Number 67,137 filed of even date herewith.

Adjacent the top of receptacles 1 and 8, I provide a new and improved combination spout and sealing assembly 13. The spout 14, best seen in Fig. 2, in one form as illustrated, may comprise a nozzle 15 projecting external to the wall of receptacle 1 and a cylindrical member 16 extending within receptacle 1 and welded or otherwise suitably secured to the wall thereof. A plurality of apertures 17 are formed in spout 14 leading from the interior of receptacle 10 into nozzle 15. Apertures 17 function both as pouring vents and as a passageway to the pouring nozzle for liquid within the water heating receptacle 1.

The inner end of cylindrical member 16 has a cup-like configuration to accommodate a hemispherical sealing washer 18 fitted on the end of an interconnecting section 19 of a liquid transferring member which, preferably, comprises three sections, 19, 20, and 21 extending from the interior of dispensing receptacle 1 through pouring spout 14 to a point adjacent the bottom of brewing receptacle 8.

A knurled nut 22 encircles the upper portion of transfer tube section 20 and is threaded to cylindrical member 16. As nut 22 is tightened, it presses against an annular shoulder 23 secured to tube section 20 adjacent its upper flared end 24 and causes a fluid-tight connection to be made between sealing washer 18 and flared end 24.

In order to make an easily separable fluid-tight connection between the heating receptacle and the brewing receptacle, I provide a cylindrical sealing member such as socket 25 welded or otherwise suitably secured to the wall of brewing receptacle 8 directly opposite nozzle 15. Socket 25 has an inner diameter slightly larger than the outer diameter of nozzle 15 and is lined with a cylindrical sealing gasket 26 preferably of a resilient material such as rubber. The sealing gasket 26 has an inner diameter slightly smaller than the outer diameter of nozzle 15 and tightly adheres without further sealing means to nozzle 15 when the nozzle is forcibly inserted therein causing a fluid-tight connection to be made between socket 25 and nozzle 15.

A knurled nut 27 is threaded to the inwardly extending end of socket 25 and presses against an annular shoulder 28 welded or otherwise suitably secured to the upper portion of transfer tube section 21 adjacent its upper flared end 29 and thereby adjustably positions the flared end 29 within socket 25. When properly adjusted, as illustrated in Fig. 1, the flared end 29 tightly engages a hemispherical sealing washer 30 on the end of interconnecting transfer tube section 19 when nozzle 15 is inserted within sealing gasket 26 thereby making a fluid-tight connection between tube section 19 and tube section 21.

As can be appreciated from the foregoing description, both the fluid-tight connection between nozzle 15 and the socket 25 and the fluid-tight connection between tube section 19 and tube section 21 can be easily made by the single operation of inserting nozzle 15 within sealing gasket 26. Conversely, both connections may be easily separated by simply withdrawing the nozzle 15 from within sealing gasket 26.

On the bottom end of tube section 21 just above recessed portion 9 of brewing receptacle 8, I provide means for filtering the coffee which, preferably, comprises a bell-shaped filter holder 31 on which a filter cloth 32 is mounted and drawn tight by a means of a draw string 33.

In order to cause the coffee making process to be completely automatic, I provide means for automatically reducing the heat applied to heating receptacle 1 at a predetermined point during the coffee infusion period, such means embodying the features described and claimed in the aforementioned patents to W. R. Weeks and E. C. Sullivan. This automatic heat reducing means may, in one form as shown, comprise a tubular member 34 secured to the lower end of tube section 20 and extending to a point adjacent the bottom of heating receptacle 1. An aperture 35, functioning as a brew compensator, is formed in the wall of tubular member 34. A cup-shaped end cap 36 covers the lower end of tubular member 34 and preferably is composed of a resilient metal which adheres as a spring fit to the walls of tubular member 34 without the necessity of further holding means. End cap 36 has a centrally positioned hole 37 and a plurality of circumferentially arranged apertures 38 leading from the heating receptacle 1 into the interior of tubular member 34. A rod 39 is slidably inserted through hole 37 along the longitudinal axis of tubular member 34. On the lower end of rod 39 external to tubular member 34 an armature 40, preferably nickel, is secured. Armature 40 normally rests on the bottom of heating receptacle 1. A perforate disk 41 having a diameter almost equal to the inner diameter of tubular member 34 is centrally secured to the upper end of rod 39. Spaced a short distance below disk 41 is an imperforate washer 42 having a loose fitting central hole and resting on an annular shoulder 43 secured to rod 39.

Directly beneath armature 40 within stove 6 is a cylinder 44 containing a vertically reciprocable magnetic member such as piston 45 preferably of the sintered aluminum, nickel, cobalt type. Piston 45 is secured to a downwardly extending plunger 46 having an annular shoulder 47 at its lower end. When magnetic piston 45 is at the bottom of cylinder 44, as illustrated in Fig. 1, the annular shoulder 47 on plunger 46 holds a switching arm 48 away from a rigid arm 49 of a switch 50 and functions to open a pair of contacts 51 and 52. Switch 50, when suitably connected, controls a main heating element 53. When piston 45 is adjacent the top of cylinder 44, plunger 46 permits contacts 51 and 52 to engage, thereby energizing heating element 53. An actuating lever 54 having one end 55 directly beneath plunger 46 is fulcrumed on a pin 56. When lever 54 is depressed, the end 55 of lever 54 forces piston 45 to the top of cylinder 44.

In its raised position, piston 45 adheres to armature 40 because of its magnetic attraction thereto. As armature 40 is elevated, the magnetic attraction between these two elements is decreased and piston 45 drops to its lower position since it has nothing to which it can adhere.

In the operation of my invention, ground coffee is placed in the bottom of brewing receptacle 8, water to the amount of coffee desired is poured into water heating receptacle 1, and cover 3 is closed and clamped tight. The water heating receptacle is positioned on stove 6 by inserting nozzle 15 within socket 25, and the actuating lever 54 is depressed. Piston 45 is forced thereby to its raised position and the annular shoulder 47 of plunger 46 releases switching arm 48, closing contacts 51 and 52 and energizing the main heating element 53.

As the temperature of the water within the heating receptacle increases, vapor pressure is generated within the heating receptacle until the heated water is forced up through tubular member 34 and transfer tube sections 20, 19 and 21 into brewing receptacle 8 where it mixes with the ground coffee placed therein previously. In passing through tubular member 34, the heated water flows through apertures 38 in end cap 36, around the sides of imperforate washer 42 and through the perforations of disk 41. When the rush of water within the tubular member 34 reaches sufficient volume, loosely fitting imperforate washer 42 is carried up rod 39 until it closes the perforations of disk 41. The vapor pressure within heating receptacle 1 continues to increase until the velocity of the water within tubular member 34 is sufficient to elevate the entire rod and armature assembly. Since magnetic piston 45 no longer has anything to which it can magnetically adhere, it drops to its lower position, opening switch 50 and deenergizing the main heating element 53.

As the heating vessel cools, the vapor within it condenses and a partial vacuum is created which finally draws the brewed coffee back through filter 32, liquid transfer sections 21, 19 and 20 and tubular member 34 into the heating receptacle 1. Because of the recessed portion 9 of the bottom of brewing receptacle 8, the filter holder 31 can be extended very close to the level of the bottom surface without interfering with the flow of liquid. As a result, only a very small amount of brewed coffee is left within the brewing receptacle 8 after the vacuum is created and the coffee is drawn back into the heating receptacle 1.

When it is desired to serve the coffee, the heating receptacle 1 is grasped by its handle and pulled up and away from its socket connection. In pouring, the coffee flows out through apertures 17 and nozzle 15. The upper apertures 17 of spout 14 act as air vents to allow the coffee to pour evenly.

If only small amounts of coffee are desired, aperture 35 in tubular member 34 acts as a brew compensator to prevent the premature transfer of water into the brewing receptacle as described and claimed in U. S. Patent 2,287,583 granted to W. R. Weeks, June 23, 1942.

Transfer tube sections 20 and 21 may be withdrawn for cleaning purposes by simply unscrewing knurled nuts 22 and 28 respectively. End cap 36 may be pulled away from tubular member 34 in order to permit cleaning the rod and disk assembly as well as the interior of the tubular member 34 itself.

Although I have shown my invention preferably as being constructed to be completely automatic and to be used in conjunction with an electric stove such as described and claimed in the aforementioned patents, it is to be understood that my invention is also operable without the incorporation of these automatic features. Tubular member 34 together with its inserted rod and armature assembly may be omitted and the resultant coffee maker can be heated and controlled by conventional means.

It is also to be understood that although I have shown a particular embodiment of my invention, I do not wish to be limited thereto since many modifications may be made, and I therefore, contemplate by the appended claims to cover all such modifications as fall within the true spirit and scope of my invention.

What I claim as new and desire to secure by Letters Patent of the United States is:

1. In a coffee maker, a brewing receptacle, a water heating receptacle removably positioned beside said brewing receptacle, said heating receptacle having a handle and a cover sealable thereto, a spout secured to said heating receptacle having a cylindrical portion extending thereinto and a nozzle projecting normal to the wall thereof, said cylindrical portion having a plurality of annular apertures formed therein, liquid transferring means comprising a plurality of separably connected tubes extending from said heating receptacle through said spout to a point adjacent the bottom of said brewing receptacle, one of said separable connections being located within said spout, coffee filtering means secured within said brewing receptacle to the lower end of one of said tubes, and a socket secured to said brewing receptacle and having a resilient gasket arranged to receive and adhere to said nozzle to form an easily separable fluid-tight connection between said nozzle and said socket.

2. In a vacuum type coffee maker, an open brewing receptacle, a sealable water heating receptacle positionable beside said brewing receptacle and having a spout projecting from a wall thereof, a sealing member secured to said brewing receptacle and having a resilient gasket arranged to receive and adhere to said spout to form an easily separable fluid tight connection therewith, and liquid transferring means comprising at least two tubes extending from said heating receptacle through said spout and said sealing member into said brewing receptacle, said tubes being arranged to make a separable contact connection within said spout when said spout is received by said sealing member.

3. In a coffee maker, a brewing receptacle, a sealable water heating receptacle positionable beside said brewing receptacle and having a spout projecting from a wall thereof, liquid transfer means extending from said heating receptacle through said spout into said brewing receptacle and having a separable connection within said spout, sealing means carried by said brewing receptacle adapted to receive said spout and to make a separable fluid tight connection between said spout and said liquid transferring means, said spout having a portion extending within said heating receptacle and having apertures formed in said internal portion whereby liquid may be poured out of said spout upon disconnection of said spout from said sealing means.

4. In a coffee maker, a brewing receptacle, a sealable water heating receptacle removably positioned beside said brewing receptacle, a spout projecting from a wall of said heating receptacle and having a portion extending thereinto, said internal portion having at least one aperture formed in the inner wall thereof, liquid transferring means comprising at least two tubes separably connected within said spout and extending from said heating receptacle through said spout into said brewing receptacle, and a sealing member secured to said brewing receptacle and having a resilient gasket arranged to receive and adhere to said spout to form an easily separable fluid tight connection between said spout and said liquid transferring means.

5. In a vacuum type coffee maker, a sealed water heating receptacle having a spout projecting from a wall thereof, a coffee brewing receptacle positionable beside said heating receptacle and having a sealing member in a wall thereof adapted to receive said spout, a first liquid transfer tube extending into said spout from a point adjacent the bottom of said heating receptacle, a second liquid transfer tube extending through said sealing member from a point adjacent the bottom of said brewing receptacle, said sealing member including means for forming a fluid tight connection between said spout and said second tube, and said tubes being arranged to make liquid transferring contact connection within said spout when said spout is received within said sealing means.

ALLAN M. YOUNG.

REFERENCES CITED

The following references are of record in the file of this patent:

UNITED STATES PATENTS

| Number | Name | Date |
|---|---|---|
| 55,509 | Liesche | June 12, 1866 |
| 2,097,681 | Wolcott | Nov. 2, 1937 |
| 2,269,111 | Jepson | Jan. 6, 1942 |
| 2,287,580 | Wagner | June 23, 1942 |
| 2,409,226 | Schlumbohm | Oct. 15, 1946 |

FOREIGN PATENTS

| Number | Country | Date |
|---|---|---|
| 561,453 | Germany | Oct. 14, 1932 |
| 597,745 | Great Britain | Feb. 2, 1948 |